Dec. 23, 1958     A. V. HOLINSHEAD     2,865,591
HOSE-CLAMP
Filed Feb. 23, 1956
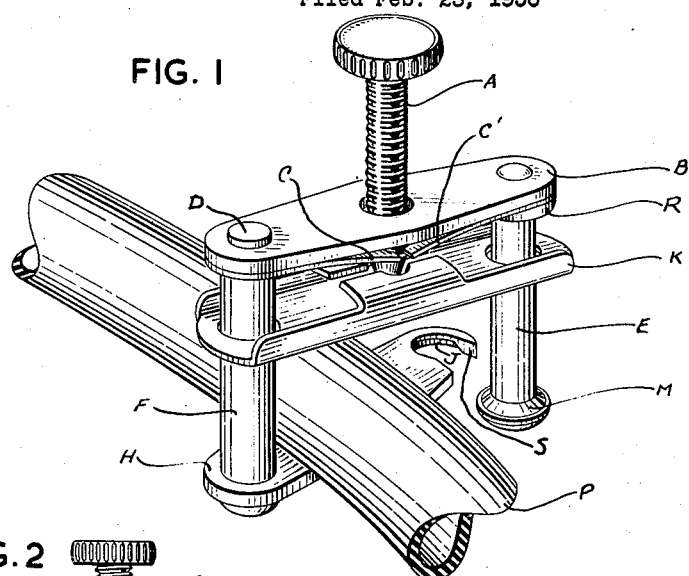
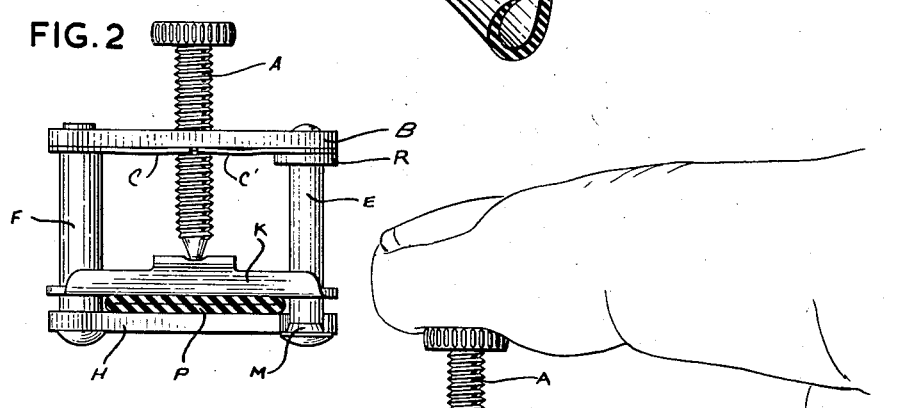
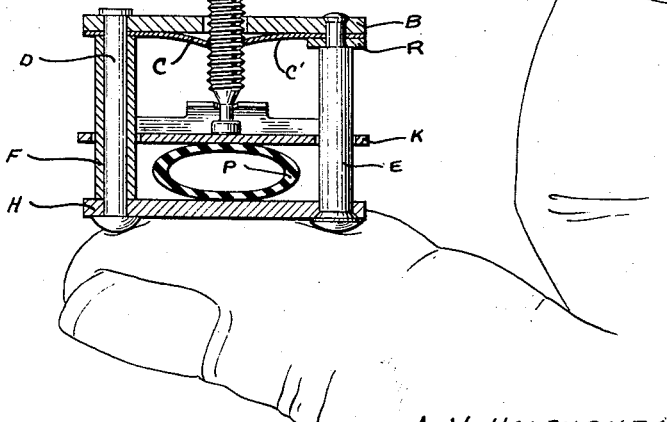
A. V. HOLINSHEAD
Inventor
Attorney

ис
2,865,591
HOSE-CLAMP

Alida Viola Holinshead, Toronto, Ontario, Canada

Application February 23, 1956, Serial No. 567,224

1 Claim. (Cl. 251—8)

The present invention relates to a new and improved device for clamping a hose so as to arrest or regulate the flow of a liquid through it.

Many of the existing methods of clamping hoses utilize a screw clamping mechanism which entails the laborious process of slowly closing the flow through the hose by screwing down a clamp thread-by-thread. Frequently, these types of clamps are held on to a rigid frame piece with a detachable base plate, but many of them have no means whereby they can be slipped around the hose easily. They must be positioned on the hose before the ends of the hose are used to interconnect various apparatus. Being pre-positioned, it is often found that they are in an awkward position for operation and in general tend to unduly encumber the hose.

There are clamps in existence which can be attached around a hose conveniently but they are the type which cannot be closed readily. There are, on the other hand, clamps which can close quickly by means of slides and catching devices but they are the type which must be pre-positioned on the tube.

The present invention relates to a clamp which not only can be easily slipped on to a hose that is already in use but which also can be clamped quickly and without the awkward necessity of turning a screw thread-by-thread down on the hose.

The unique construction of the applicant's hose clamp allows it to be closed with two or three fingers rather than with both hands. This feature is of particular advantage to technicians such as nurses in hospitals and is due to the manner in which the screw part of the clamp slips through the spring nut when pressure is applied to the head of the screw. Another advantage is the ease with which this clamp can be slipped over and securely fastened to a hose. This feature is due to the method of counter-sinking the slot on the base plate and of making a chamfered shoulder on the inner side of the pillar head which allows the base plate to be snapped securely closed over the pillar head or to be opened widely to permit its application to a hose.

The invention consists of a clamping or compressing member guidably mounted between two side supports of a frame and attached to the lower end of a threaded member or screw. The threads on the screw are of small depth and run throughout its length from the point of connection with the clamping member to its head. The threads of the screw work through a pair of spring steel members which are mounted directly beneath a top plate member in such a way that when pressure is applied to the head of the screw in closing the screw slips through the grip of the nut-like action of the spring steel members. When the clamp is closed however, the reactive upwardly pressure of the clamped hose does not push the screw back through the nut because the top plate is in intimate contact with the spring-nuts and prevents them from giving way, resulting in the nut-like spring members holding fast, as with an ordinary nut. The screw passes freely through a hole in the top plate which acts as a guide but does not inhibit the free movement up and down of the screw. The top plate is attached rigidly to the top of the side supports. A base plate is pivotally attached to the bottom end of one of the side supports and is detachably connected to the other by the snap action of a counter-sunk slot on the base plate on the chamfered shoulder of the side support.

The invention is illustrated in the attached drawings and hereinafter is more fully described.

Figure 1 shows a perspective view of the device in the open position;

Figure 2 is a front elevation of the clamp in a closed position;

Figure 3 is a cross-sectional view of the clamp in the process of being closed by digital pressure.

With reference to the drawings, A is a large headed screw that is attached to the clamp plate K. Screw A passes freely through the threadless top plate B, which, of course, permits top plate B to be punch-pressed in manufacture. The thread on screw A does not extend to full normal depth which allows it to have wider tolerance in manufacture and thus greater strength. Spring nut members C—$C^1$ are attached directly beneath B. When screw A is pushed down, spring nut C—$C^1$ permits screw A to slip through thread-by-thread due to the spring action of spring nut members C—$C^1$. This allows the clamping operation to be accomplished with one hand rather than with two as is necessary when screw A is threadably engaged with top plate B. Spring nut members C and $C^1$ are made of light spring steel, and are identical parts, a feature which simplifies their manufacture and assembly.

Two side supports E and D, of equal length, hold top plate B and base plate H apart in a rigid frame. Side support E is rivetted onto plate B and has an accentuated shoulder R for holding the half spring nut member C fast against B. The head on the lower end of side support E has a chamfered shoulder M so that it fits snugly into the counter-sunk slots on base plate H. Side support D has a head which is flat on its inner side. A tube F fits around side support D and acts so as to hold the spring nut member C, securely against B at one end and so as to hold base plate H securely against the head of side support D at the other end.

Base plate H is held between tube F and the head of side support D but is free to rotate in a horizontal plane. The free end of base plate H has a slot S cut into it by means of which the chamfered shoulder M of side support E is caught and held. The inside face J of the slot on the bottom side of base plate H is counter-sunk so as to engage snugly with the chamfered shoulder M machined on the head of side support E.

It will be noted that the slot S of the base plate H will securely engage the side support D by means of the counter-sunk slot and the chamfered shoulder M, so that the base plate H will not become disengaged from the side support D without the application of pressure thereto. The pressure necessary to bring the base plate H and the side support D into engagement is not so great, however, that it cannot be performed by the mere pressure of thumb and forefinger, which is an advantage to technicians such as nurses.

Screw A is attached at its lower end to the clamp member K. K is free to slide between side supports E and D.

The following is a brief explanation of the operation of the device. With the clamp K retracted, the base plate H may be snapped open and a tube inserted between clamp K and base plate H as shown in Figure 1. Then the base plate may be snapped into position on side support E, as explained hereinbefore, and the clamp now is ready for use. With thumb and finger in position as shown in Figure 3, pressure is applied to the screw member A, thus extending the spring nut members C—C¹ away from the top plate B so that the screw member passes through and causes the hose P to be constricted to the desired amount due to downward pressure exerted by clamp K.

As the pressure of the fingers is removed the resultant upward pressure created by the hose will bring the screw member back into screw-threaded engagement with the spring nut members C—C¹ which in turn return to their normal position against the top plate B. The screw member A may then be tightened to completely close the tube, as shown in Figure 2. The clamping action will be maintained until such time as the pressure is released by unscrewing screw member A. In normal use it is not possible to release the pressure on hose P by withdrawing screw member A in any way other than by screwing it past the spring nut members C—C¹. The ratchet-like action of the members C—C¹ on the screw member A permits sliding movement thereof in one direction only namely in the direction to increase the pressure of clamp K on the hose.

It has been found that whereas the old type of clamp became easily worn and jammed in operation, the present clamp by use of the spring nut and the sliding clamp avoids these disadvantages. A more rigid frame has been developed by rivetting the side supports to plate B.

In the older types of clamp the base plate H moved freely on the side supports. However, it is a feature of this clamp to secure the base plate H at one end of the side support by means of tube F. This feature together with the method of snapping the slot to the side support prevents the base from becoming undone easily which is an important consideration in delicate hospital or laboratory usage.

In general, the present clamp has not only the advantage of greater rigidity, but also has the very desirable feature of being capable of being fastened around a hose P and of then being clamped down on the hose with one hand only. It has been found in fact that a dexterous technician can manipulate the clamp with thumb and forefinger alone.

The components for this clamp are made of stainless steel, brass or other corrosion-resisting metal in order to avoid the incidence of rusting which takes place in instruments of this nature due to being subjected to frequent sterilization required in hospitals and laboratories.

What I claim as new and desire to protect by United States Letters Patent is:

A hose clamp comprising a top plate, side supports attached to said top plate to form a rigid U-shaped member, a base plate pivotally mounted at one end on one of said side supports, means for releasably engaging the free end of said base plate with the other side support comprising a countersunk slot adjacent the free end of the base plate and a chamfered head on the side support in register with said countersunk slot for snap engagement therewith, a pair of spring nut members held in position on the underside of said top plate by said side supports and having their inner ends free, a clamping member slidably mounted on said side supports for movement between said base plate and said top plate, a threaded screw member which passes freely through said top plate in threaded engagement with the free ends of said spring nut members, and with its lower end journalled in said clamping member, said spring nut members being flexible away from said top plate in the direction of movement of said screw member therethrough to move said screw member out of its screw-threaded engagement with said spring nut members and into sliding engagement therewith.

References Cited in the file of this patent

UNITED STATES PATENTS

| | | |
|---|---|---|
| 756,679 | Miller | Apr. 5, 1904 |
| 2,342,690 | Place | Feb. 29, 1944 |
| 2,584,828 | Ballou | Feb. 5, 1952 |
| 2,632,217 | Flora | Mar. 24, 1953 |
| 2,675,875 | Potts | Apr. 20, 1954 |

FOREIGN PATENTS

| | | |
|---|---|---|
| 639,646 | Great Britain | of 1950 |